(12) United States Patent  
Anand et al.

(10) Patent No.: US 8,108,866 B2
(45) Date of Patent: *Jan. 31, 2012

(54) HEURISTIC BASED AFFINITY DISPATCHING FOR SHARED PROCESSOR PARTITION DISPATCHING

(75) Inventors: Vaijayanthimala K. Anand, Austin, TX (US); Dean J. Burdick, Austin, TX (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 882 days.

This patent is subject to a terminal disclaimer.

(21) Appl. No.: 12/130,090

(22) Filed: May 30, 2008

(65) Prior Publication Data

US 2008/0235684 A1    Sep. 25, 2008

Related U.S. Application Data

(63) Continuation of application No. 11/419,019, filed on May 18, 2006, now Pat. No. 7,865,895.

(51) Int. Cl.
*G06F 9/46* (2006.01)
*G06F 12/08* (2006.01)
*G06F 13/00* (2006.01)
*G06F 13/28* (2006.01)

(52) U.S. Cl. ............ 718/102; 718/105; 718/108; 711/3; 711/113; 711/118

(58) Field of Classification Search .......................... None
See application file for complete search history.

(56) References Cited

U.S. PATENT DOCUMENTS

| 5,063,500 | A |   | 11/1991 | Shorter |  |
|---|---|---|---|---|---|
| 5,185,861 | A |   | 2/1993 | Valencia |  |
| 5,261,053 | A |   | 11/1993 | Valencia |  |
| 5,345,590 | A |   | 9/1994 | Ault et al. |  |
| 5,692,193 | A |   | 11/1997 | Jagannathan et al. |  |
| 5,802,386 | A |   | 9/1998 | Kahle et al. |  |
| 5,826,079 | A | * | 10/1998 | Boland et al. ................. | 718/102 |
| 5,872,972 | A | * | 2/1999 | Boland et al. ................. | 718/102 |
| 6,058,466 | A |   | 5/2000 | Panwar et al. |  |
| 6,243,788 | B1 | * | 6/2001 | Franke et al. .................... | 711/3 |
| 6,615,316 | B1 |   | 9/2003 | McKenney et al. |  |
| 6,625,638 | B1 |   | 9/2003 | Kubala et al. |  |
| 6,665,699 | B1 |   | 12/2003 | Hunter et al. |  |
| 6,904,594 | B1 | * | 6/2005 | Berry et al. ................... | 718/100 |

(Continued)

OTHER PUBLICATIONS

IP.com Prior Art Database Technical Disclosure "System and method to optimzie cache and memory affinity in a virtualized environment". by IBM Published on Feb. 9, 2006.*

(Continued)

*Primary Examiner* — Emerson Puente
*Assistant Examiner* — Adam Lee
(74) *Attorney, Agent, or Firm* — Stephen R. Tkacs; Stephen J. Walder, Jr.; Matthew W. Baca (57) ABSTRACT

A mechanism is provided for determining whether to use cache affinity as a criterion for software thread dispatching in a shared processor logical partitioning data processing system. The server firmware may store data about when and/or how often logical processors are dispatched. Given these data, the operating system may collect metrics. Using the logical processor metrics, the operating system may determine whether cache affinity is likely to provide a significant performance benefit relative to the cost of dispatching a particular logical processor to the operating system.

18 Claims, 4 Drawing Sheets

U.S. PATENT DOCUMENTS

| | | | |
|---|---|---|---|
| 6,996,822 | B1 | 2/2006 | Willen et al. |
| 7,178,145 | B2 | 2/2007 | Bono |
| 7,318,128 | B1 * | 1/2008 | Dice .............................. 711/151 |
| 7,340,522 | B1 | 3/2008 | Basu et al. |
| 7,464,380 | B1 | 12/2008 | Hempel |
| 2002/0004966 | A1 | 1/2002 | Wakat et al. |
| 2003/0212731 | A1 * | 11/2003 | Brenner et al. ............... 709/105 |
| 2005/0210472 | A1 | 9/2005 | Accapadi et al. |
| 2005/0246461 | A1 * | 11/2005 | Accapadi et al. ............. 710/200 |
| 2006/0036810 | A1 * | 2/2006 | Accapadi et al. ............. 711/132 |
| 2006/0133418 | A1 | 6/2006 | Anand |
| 2006/0168217 | A1 | 7/2006 | Anand |
| 2006/0206891 | A1 | 9/2006 | Armstrong et al. |
| 2007/0061805 | A1 | 3/2007 | Brenner |
| 2007/0271563 | A1 | 11/2007 | Anand et al. |
| 2007/0271564 | A1 | 11/2007 | Anand et al. |
| 2009/0235270 | A1 | 9/2009 | Anand et al. |

OTHER PUBLICATIONS

U.S. Appl. No. 11/419,019.

U.S. Appl. No. 11/419,047.

U.S. Appl. No. 12/130,064.

Notice of Allowance mailed Aug. 19, 2010 for U.S. Appl. No. 11/419,019, 20 pages.

Notice of Allowance mailed Sep. 3, 2010 for U.S. Appl. No. 11/419,047, 11 pages.

Office Action dated Aug. 5, 2010 in U.S. Appl. No. 12/130,064, 28 pages.

Response to Office Action filed with the USPTO on Nov. 4, 2010 for U.S. Appl. No. 12/130,064, 12 pages.

Fowler, Robert J. et al., "Mercury: Object-Affinity Scheduling and Continuation Passing on Multiprocessors", Springer Berlin/Heidelberg, vol. 817, 1994, pp. 661-676.

Squillante, M. S., Issues in Shared-Memory Multiprocessor Scheduling: A Performance Evaluation PhD thesis, Department of Computer Science and Engineering, University of Washington, Oct. 1990, 172 pages.

Amendment under 37 C.F.R. § 312 After Allowance filed with the USPTO on Nov. 18, 2010 for U.S. Appl. No. 11/419,019, 7 pages.

Final Office Action mailed Dec. 28, 2010 for U.S. Appl. No. 12/130,064, 26 pages.

Response to Final Office Action filed with the USPTO on Mar. 17, 2011 for U.S. Appl. No. 12/130,064, 15 pages.

* cited by examiner

FIG. 1
100 DATA PROCESSING SYSTEM

FIG. 2

200 LOGICALLY PARTITIONED PLATFORM

HEURISTIC BASED AFFINITY DISPATCHING FOR SHARED PROCESSOR PARTITION DISPATCHING

CROSS REFERENCE TO RELATED APPLICATIONS

This application is a continuation of application Ser. No. 11/419,019, filed May 18, 2006, now U.S. Pat. No. 7,865,895.

This application is related to co-pending U.S. patent application Ser. No. 11/419,047, entitled "METHOD, APPARATUS, AND PROGRAM PRODUCT FOR OPTIMIZATION OF THREAD WAKE UP FOR SHARED PROCESSOR PARTITIONS," filed on an even date herewith.

BACKGROUND

1. Technical Field

The present application relates generally to an improved data processing system and method. More specifically, the present application is directed to mechanisms for heuristic based affinity dispatching for shared processor partition dispatching.

2. Description of Related Art

Logical partitioning (LPAR) is the ability to make a server run as if it were two or more independent servers. When one logically partitions a server, one divides the resources on the server into subsets called logical partitions. Processors, memory, and input/output devices are examples of resources that can be assigned to logical partitions. A logical partition runs as an independent logical server with the processor, memory, and I/O resources allocated to it. Examples of the kinds of software that can be installed and run on logical partitions include the AIX®, i5/OS™, and Linux® operating systems and Virtual I/O Server software. "AIX" and "i5/OS" are trademarks of International Business Machines Corporation in the United States, other countries, or both. "LINUX" is a trademark of Linus Torvalds in the United States, other countries, or both.

The Hardware Management Console (HMC) is an example of a hardware appliance that connects to the server firmware. The HMC may be used to specify to the server firmware how to allocate resources among the logical partitions on the managed system. The HMC may also be used to start and stop the logical partitions, update server firmware code, manage Capacity on Demand, and transmit service information to service and support if there are any hardware problems with the managed system. The server firmware is code that is stored in system flash memory on the server. The server firmware directly controls resource allocations on the server and communications between logical partitions on the server.

Although each logical partition acts as an independent server, the logical partitions on a physical server can share some kinds of resources with each other. The ability to share resources among many logical partitions allows increased resource utilization on the server by shifting the server resources to where they are needed.

A processor is a device that processes programmed instructions. The more processors assigned to a logical partition, the greater the number of concurrent operations the logical partition can run at any given time. Dedicated processors are whole processors that are assigned to a single partition. Shared processors are physical processors whose processing capacity is shared among multiple logical partitions.

The ability to divide physical processors and share them among multiple logical partitions is known as Micro-Partitioning™ or shared processor logical partitioning (SPLPAR). Micro-Partitioning™ (or shared processing) allows logical partitions to share the processors in the shared processor pool. "MICRO-PARTITIONING" is a trademark of International Business Machines Corporation in the United States, other countries, or both. The shared processor pool includes all processors on the server that are not dedicated to specific logical partitions. Each logical partition that uses the shared processor pool is assigned a specific amount of processor power from the shared processor pool. If the logical partition needs more processor power than its assigned amount, the logical partition may (capped/uncapped defines this) use the unused processor power in the shared processor pool. The amount of processor power that an uncapped logical partition can use is limited only by the virtual processor settings of the logical partition and the amount of unused processor power available in the shared processor pool.

Virtualization is the pooling of data processing resources in a way that shields the physical nature and boundaries of those resources from users. Virtualization of processors through shared processor partitioning involves an additional layer of software, or firmware, between the operating system(s) and the hardware. Additionally, optimizations to the operating system(s) are usually required for best performance and responsiveness.

In the operating system, when a software thread is waiting on some event (e.g., a lock wait or waiting on data to reach a socket) and the event occurs, the operating system makes the software thread runnable and determines on which logical processor to run the thread. Work to be done within an operating system is broken into processes and further into threads. Generally speaking, a process is usually, but not always, analogous to an application program. The threads of a process share the same virtual address space, but run semi-independently. Thus, while one thread is waiting for a file to be read in from disk, another thread can be performing calculations, for example. Typically, the operating system attempts to run the thread on the same logical processor to maintain cache affinity.

One very key factor in the overhead introduced with shared processor partitioning is cache thrashing. Effectively, each operating system has a set of unique storage that it typically touches when running work. In a system without shared processor logical partitioning, the hardware caches of the system tend to do a good job of containing a set of unique storage, or footprint. However, with shared processor logical partitioning, the firmware dispatches and undispatches processors to operating systems over time, which tends to reduce the effectiveness of the hardware caches.

SUMMARY

The exemplary embodiments recognize the disadvantages of the prior art and provide a mechanism for determining whether to use cache affinity as a criterion for software thread dispatching in a shared processor logical partitioning data processing system. The server firmware may store data about when and/or how often logical processors are dispatched. Given these data, the operating system may collect metrics. Using the logical processor metrics, the operating system may determine whether cache affinity is likely to provide a significant performance benefit relative to the cost of dispatching a particular logical processor to the operating system.

In one illustrative embodiment, a method for determining whether to use cache affinity as a criterion for software thread dispatching in a shared processor logical partitioning data processing system is provided. Responsive to a software thread being made ready to run, the method determines whether cache affinity is not likely to provide a performance benefit. Responsive to a determination that cache affinity is not likely to provide a performance benefit, the method selects a logical processor based on other criteria. The method queues the software thread to run on the selected logical processor.

In one exemplary embodiment, responsive to a determination that cache affinity is likely to provide a performance benefit, the method identifies a logical processor on which the software thread was last dispatched and queues the software thread to run on the logical processor on which the software thread was last dispatched.

In another exemplary embodiment, determining whether cache affinity is not likely to provide a performance benefit comprises determining whether the software thread has been undispatched for a predetermined period of time.

In yet another exemplary embodiment, determining whether cache affinity is not likely to provide a performance benefit comprises determining whether a logical processor on which the software thread was last dispatched has not been undispatched since the last time the software thread was dispatched.

In a further exemplary embodiment, determining whether cache affinity is not likely to provide a performance benefit comprises determining whether a logical processor on which the software thread was last dispatched has been dispatched and undispatched since the last time the software thread was undispatched.

In yet another exemplary embodiment, determining whether cache affinity is not likely to provide a performance benefit comprises determining whether a logical processor on which the software thread was last dispatched has been dispatched and undispatched a predetermined number of times since the last time the software thread was undispatched.

In another exemplary embodiment, determining whether cache affinity is not likely to provide a performance benefit comprises determining whether a number of non-affinity dispatches of a logical processor on which the software thread was last dispatched is non-zero.

In another illustrative embodiment, an apparatus for determining whether to use cache affinity as a criterion for software thread dispatching in a shared processor logical partitioning data processing system is provided. The apparatus may comprise an operating system running in a shared processor logical partition and a server firmware that dispatches resources to the operating system. Responsive to a software thread being made ready to run, the operating system may determine whether cache affinity is not likely to provide a performance benefit. Responsive to a determination that cache affinity is not likely to provide a performance benefit, the operating system may select a logical processor based on other criteria. The operating system may queue the software thread to run on the selected logical processor.

In other exemplary embodiments, the apparatus performs various ones of the operations outlined above with regard to the method in the illustrative embodiments.

In another illustrative embodiment, a computer program product comprising a computer useable medium having a computer readable program is provided. The computer readable program, when executed on a computing device, may cause the computing device to responsive to a software thread being made ready to run, determine whether cache affinity is not likely to provide a performance benefit. Further, the computer readable program may cause the computing device to select a logical processor based on other criteria responsive to a determination that cache affinity is not likely to provide a performance benefit. Still further, the computer readable program may cause the computing device to queue the software thread to run on the selected logical processor.

In other exemplary embodiments, the computer readable program may cause the computing device to perform various ones of the operations outlined above with regard to the method in the illustrative embodiments.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
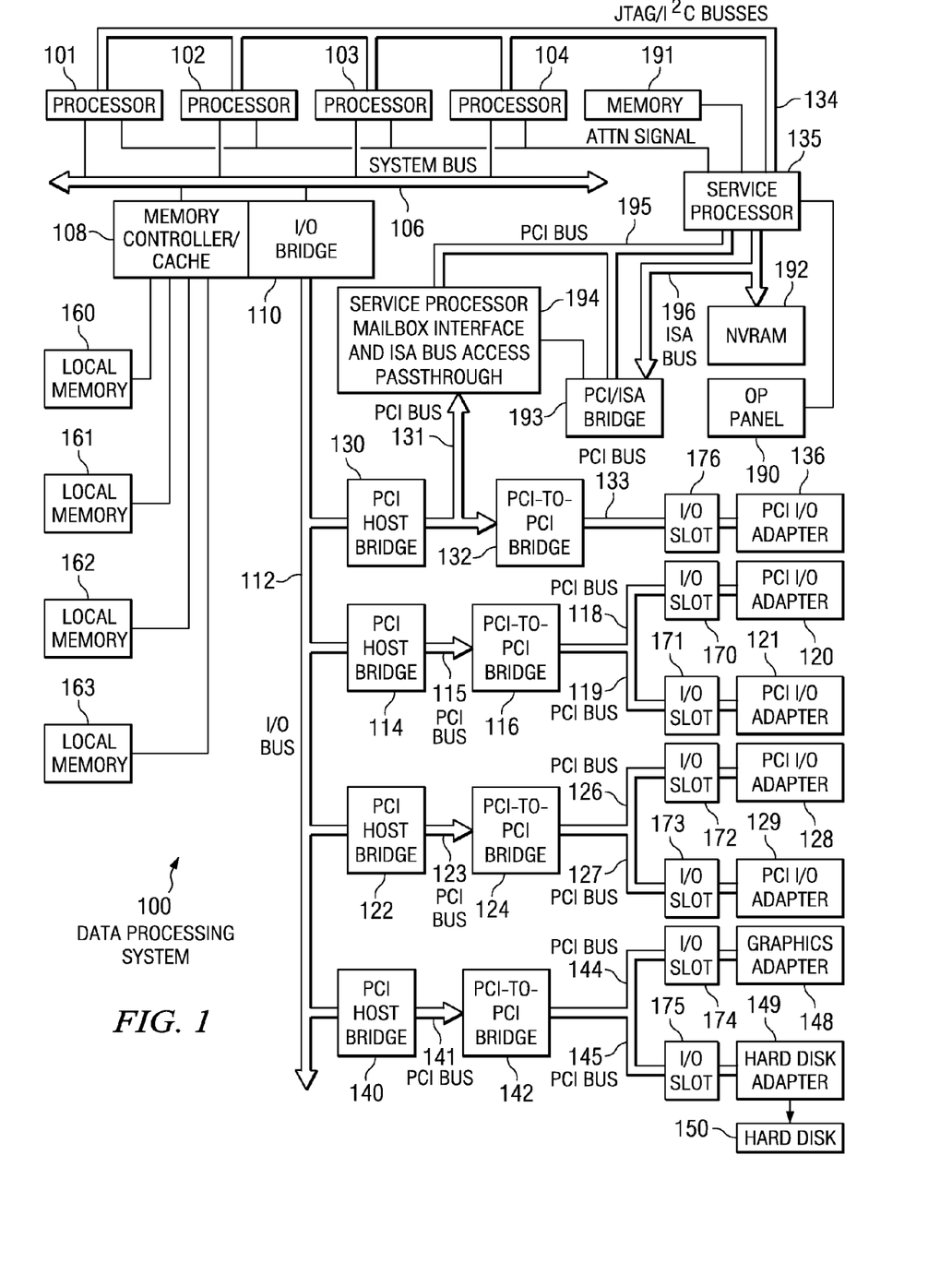
FIG. 1 is a block diagram of a data processing system in which exemplary aspects of the illustrative embodiments may be implemented.
Figure 2:
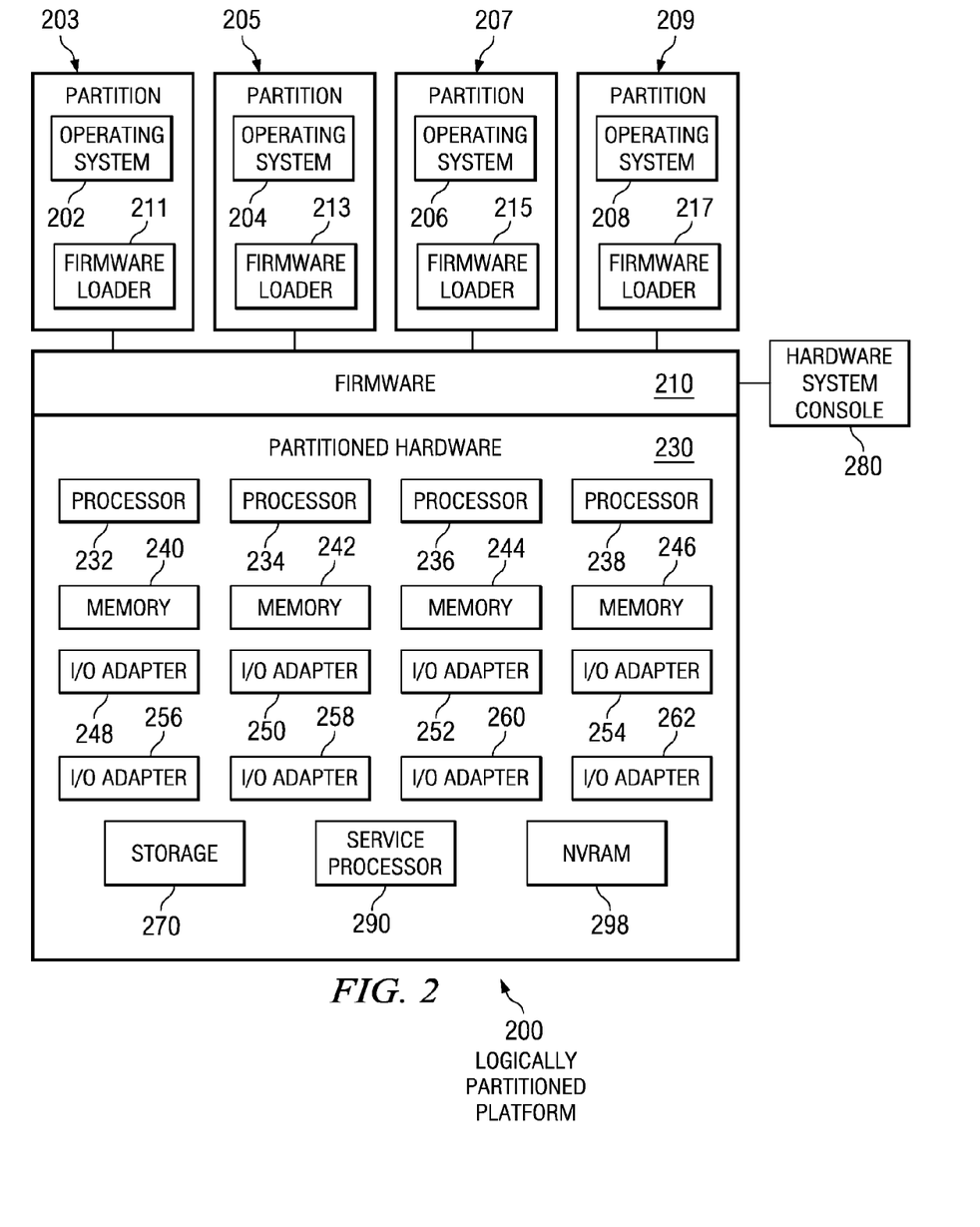
FIG. 2 is a block diagram of an exemplary logical partitioned platform in which exemplary aspects of the illustrative embodiments may be implemented.

The illustrative embodiments described herein provide mechanisms for heuristic based affinity dispatching for shared processor partition dispatching. As such, the mechanisms of the illustrative embodiments are especially well suited for implementation in a logically partitioned data processing system. The following FIGS. 1 and 2 are provided as examples of a logically partitioned data processing system in which exemplary aspects of the illustrative embodiments may be implemented. It should be noted that the example computing environments illustrated in FIGS. 1 and 2 are not intended to state or imply any limitation as to the particular types of computing environments in which the exemplary aspects of the illustrative embodiments may be implemented. Rather, many modifications to the depicted computing environments may be made without departing from the spirit and scope of the present invention.

With reference now to the figures, and in particular with reference to FIG. 1, a block diagram of a data processing system in which exemplary aspects of the illustrative embodiments may be implemented is depicted. Data processing system 100 may be a symmetric multiprocessor (SMP) system including a plurality of processors 101, 102, 103, and 104 connected to system bus 106. For example, data processing system 100 may be an IBM eServer™ data processing system, a product of International Business Machines Corporation in Armonk, N.Y., implemented as a server within a network. "eServer" is a trademark of International Business Machines Corporation in the United States, other countries, or both. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different resources, such as processors 101-104, PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163, or portions thereof, is assigned to one of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3. Although not depicted in FIG. 1, portions of remote memories (not shown) may also be assigned to logical partitions, such as P1 or P2 in the illustrative example.

Each operating system executing within data processing system 100 is assigned to a different logical partition. Thus, each operating system executing within data processing system 100 may access only those I/O units that are within its logical partition. For example, one instance of the Advanced Interactive Executive (AIX®) operating system may be executing within partition P1, a second instance (image) of the AIX® operating system may be executing within partition P2, and a Windows® XP operating system may be operating within logical partition P3. Windows® XP is a product and trademark of Microsoft Corporation of Redmond, Wash. "AIX" is a registered trademark of International Business Machines Corporation in the United States, other countries, or both. "WINDOWS" is a registered trademark of Microsoft Corporation in the United States, other countries, or both.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. Additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

A meaningful/valid configuration of system resources is still possible after taking out the elements found to be faulty during the BISTs, BATs, and memory tests. Then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM eServer™ i5 or eServer™ p5 server models available from International Business Machines Corporation. Such a system may support logical partitioning using an AIX® operating system or an i5/OS™ operating system which are also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

With reference now to FIG. 2, a block diagram of an exemplary logical partitioned platform is depicted in which exemplary aspects of the illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and firmware 210. Operating systems 202, 204, 206, and 208 may be multiple copies of a single operating system or multiple heterogeneous operating systems simultaneously running on platform 200. These operating systems may be implemented using the AIX® operating system, the i5/OS™ operating system or the Linux™ operating system, for example, which are designed to interface with server firmware. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the firmware's partition manager. The processors associated or assigned to the partitions are then dispatched to the partition's memory to execute the partition firmware.

Firmware 210 performs a number of functions and services for partitions 203, 205, 207, and 209 to create and enforce the partitioning of logical partitioned platform 200. Firmware 210 is a firmware implemented virtual machine identical to the underlying hardware. Hypervisor software is an example of server firmware available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, firmware 210 allows the simultaneous execution of independent operating system images 202, 204, 206, and 208 by virtualizing all hardware resources of logical partitioned platform 200. Virtualization is the pooling of data processing resources in a way that shields the physical nature and boundaries of those resources from operating systems and users.

Operations of the different partitions may be controlled through a hardware management console, such as hardware management console 280. Hardware management console 280 is a separate data processing system from which a system administrator may perform various functions including reallocation of resources to different partitions. Alternatively, a Virtual Partition Manager is a feature of the i5/OS™ V5R3 operating system that allows one to create and manage one operating system logical partitions by initiating a console session using service tools.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Processors 232-238 may be dispatched to partitions 203, 205, 207, 209 as dedicated processors or shared processors. Dedicated processors are whole processors that are assigned to a single partition. Shared processors are physical processors whose processing capacity is shared among multiple logical partitions. The ability to divide physical processors and share them among multiple logical partitions is known as Micro-Partitioning™ or shared processor logical partitioning (SPLPAR). The shared processor pool includes all processors in partitioned hardware 230 that are not dedicated to specific logical partitions. Each logical partition that uses the shared processor pool is assigned a specific amount of processor power from the shared processor pool.

Figure 3:
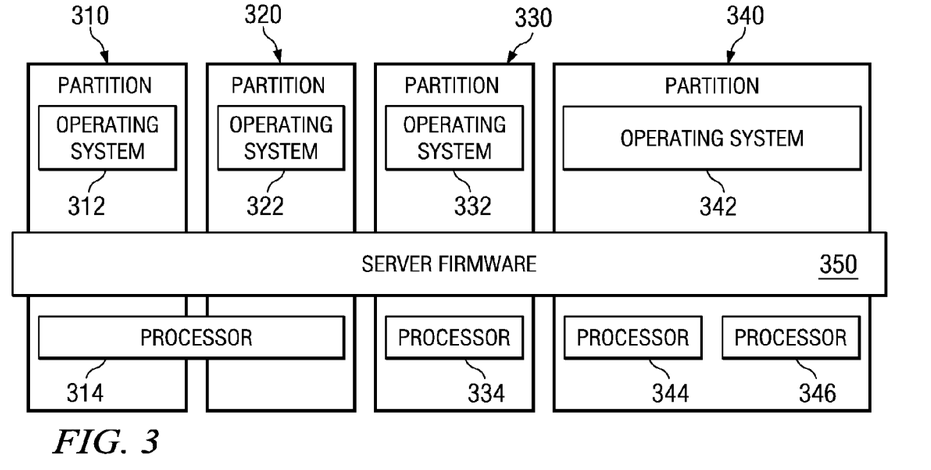
FIG. 3 illustrates an example logically partitioned data processing system with dedicated processors and shared processors in accordance with an illustrative embodiment.

FIG. 3 illustrates an example logically partitioned data processing system with dedicated processors and shared processors in accordance with an illustrative embodiment. Partition 310 runs operating system 312; partition 320 runs operating system 322; partition 330 runs operating system 332; and, partition 340 runs operating system 342. Server firmware 350 may dispatch processor 334 to partition 330 and processors 344 and 346 to partition 340 as dedicated processors. Server firmware 350 may dispatch processor 314 to partitions 310 and 320 from a shared processor pool including all processors not assigned as dedicated processors (i.e. all processors except processors 334, 344, 346).

Because operating systems 332 and 342 are assigned dedicated processors, these operating systems may make safe assumptions about cache affinity when dispatching threads to their logical processors. In the depicted example, a logical processor may be a whole physical processor or a portion of a physical processor. For example, a logical processor may be a given core of a multiple core processor or a given hardware thread in a multi-threading processor. However, the manner in which physical processors are divided into logical processors is not a focus of this disclosure.

For simplicity, consider a single operating system function that is used to place a thread, which was waiting on an event and is now ready to run, on a logical processor. For operating systems running with dedicated processor resources, the approach is to identify a logical processor that is idle. Additionally, the operating system biases the placement to try to place the thread onto the logical processor (or virtual processor) on which the thread last ran or processors associated with caches where the thread last ran. This preserves cache affinity in dedicated processor partitions.

On the other hand, operating systems 312 and 322 are assigned logical processors for their tasks from a shared processor pool. In the depicted example, a logical processor may be a portion of a physical processor. For example, a logical processor may be a given core of a multiple core processor or a given hardware thread in a multi-threading processor. As another example, a logical processor may be a time-sliced portion of a physical processor or processing core. For instance, processor 314 may be a single physical processor that is time sliced to form virtual processors for partitions 310 and 320. In this instance, each partition may receive 50% of processor 314 time-wise. That is, partition 310 may receive a 10 ms time slice and then partition 320 may receive a 10 ms time slice and so on. However, the manner in which physical processors are divided into logical processors is not a focus of this disclosure.

When running in a shared processor logical partitioning environment, the value of cache affinity is difficult to predict. This is due to the fact that the server firmware dispatches virtual processors on the physical hardware. In fact, for transactional workloads using databases or application servers, the server firmware dispatchers' effective affinity when placing the virtual processors may be very poor. This is a consequence of the fact that it is difficult to fully utilize the system in transactional environments, since the response time for transactions rises with processor utilization. Therefore, systems tend to dispatch virtual processors rapidly and for short time duration. At high system utilization the server firmware usually has a limited set of virtual processors to dispatch at any given time, which frequently results in poor affinity.

Consequently, if an operating system queues a software thread to be run on a particular logical processor, that logical processor may be currently undispatched as a result of actions by the server firmware. The overhead of the context switch for undispatching the logical processor from the other logical partition and then dispatching the logical processor may far outweigh the benefit of cache affinity, if any. Even if the logical processor is not dispatched to another physical partition, or even if the logical processor is currently dispatched to the instant operating system in question, the possibility exists that the logical processor had been dispatched to other logical partitions in the meantime, in which case there is likely no cache state left for the software thread being dispatched.

In accordance with an exemplary embodiment, the operating system determines if cache affinity is likely to be beneficial in a shared processor environment, rather than always assuming that cache affinity should be an important criterion in dispatching software threads onto logical processors. If cache affinity is most likely lost, the operating system may make dispatching decisions based on other criteria.

Figure 4:
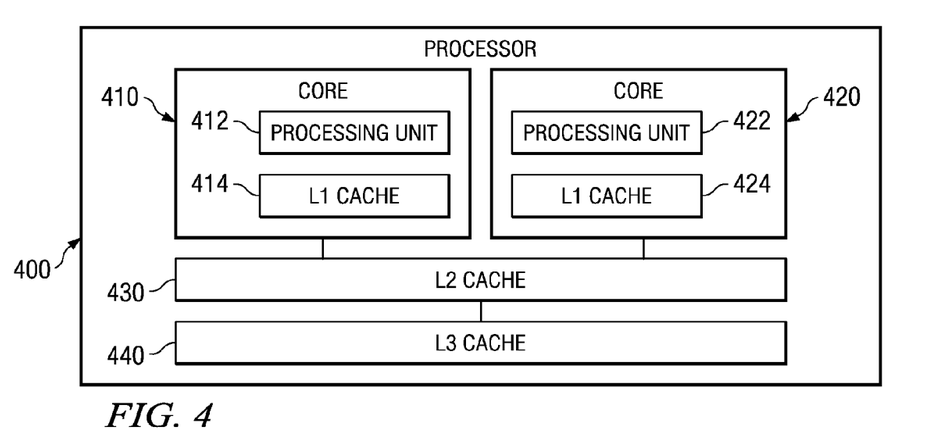
FIG. 4 illustrates an example multiple core processor to which exemplary aspects of the illustrative embodiments may apply.

Affinity is relative to cache domain. In general, the cache domain is defined according to size or latency of cache. Multiple logical processors may be in the same cache domain if they share a common cache. FIG. 4 illustrates an example multiple core processor to which exemplary aspects of the illustrative embodiments may apply. Processor 400 includes core 410 and core 420. Core 410 includes processing unit 412 and level-one (L1) cache 414. Similarly, core 420 includes processing unit 422 and L1 cache 424. In the depicted example, core 410 and core 420 share level-two (L2) cache 430 and level-three (L3) cache 440.

In one exemplary implementation, the cache domain may be defined by L1 cache, in which case core 410 and core 420 will lie in different cache domains. However, in an alternative implementation, the cache domain may be defined consistent with L3 cache, which may be the largest size cache. In this case, core 410 and core 420 will lie in the same cache domain. Thus, in this exemplary implementation a logical processor associated with core 410 may be within the same cache domain as a logical processor associated with core 420.

Consider an operating system dispatches a given software thread to run on a particular logical processor, and the server firmware dispatches the particular logical processor to run on core 410. Then, if the operating system subsequently dispatches the given software thread to run on the particular logical processor and the server firmware dispatches the logical processor to run on core 420, the logical processor will remain in the same cache domain if the cache domain is defined at the L2 cache level.

Figure 5:
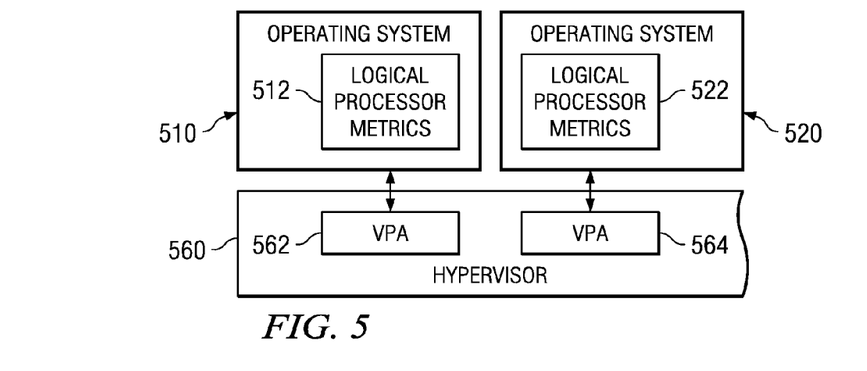
FIG. 5 is a block diagram illustrating the collection of processor metrics in a logically partitioned data processing system in accordance with one exemplary embodiment.

FIG. 5 is a block diagram illustrating the collection of processor metrics in a logically partitioned data processing system in accordance with one exemplary embodiment. Operating system 510 runs in one given partition, and operating system 520 runs in another partition. Hypervisor 560 dispatches processing resources to the partitions to support operating systems 510 and 520.

Operating system 510 registers virtual processor area (VPA) 562, and operating system 520 registers a virtual processor area 564. Virtual processor area 562, for example, serves as a two-way communications area between operating system 510 and hypervisor 560 regarding details of the virtual processor. The virtualization architecture defines a virtual processor area. When a virtual processor is created, its virtual processor area is also created. Hypervisor 560 provides to each logical processor, via the corresponding virtual processor area, a count of the total logical processor dispatches and the number of affinity logical processor dispatches.

The operating system keeps track of the last logical processor on which a software thread had been dispatched. In accordance with one exemplary embodiment, the operating system may keep all or any subset of the following metrics to use in deciding the value of affinity:
1. The time of the last undispatch of a software thread;
2. The dispatch count of the logical processor at the time that each software thread was last undispatched (e.g. running count of all dispatches for a virtual processor);
3. The dispatch count of the current dispatch of the logical processor;
4. The time of dispatch of a logical processor;
5. The number of affinity dispatches of a logical processor;
6. The physical processor on which the last dispatch of a logical processor occurred;
7. The logical processor(s) currently dispatched.

Operating system 510 keeps track of logical processor metrics 512, and operating system 520 keeps track of logical processor metrics 522, which may include all or a subset of the above metrics. Using logical processor metrics 512, 522, operating systems 510, 520 may apply an algorithm to decide the likelihood that enforcing affinity will have performance benefit versus dispatching to a logical processor based on other criteria.

If a software thread has been undispatched for a long time and the software thread is part of a single threaded process, there is likely no cache state left for that thread, because the cache space was reused by other software threads in execution. The time to replace the cache will be related to the size(s) of the processor caches, the miss rate from the caches, and the time to fetch the new contents of the cache from the various levels of the memory subsystem. The miss rate and effective latency may be observed by the operating system via the hardware performance monitor. Alternatively, a base heuristic time could be used. The operating system may handle special tracking for multi-threaded processes to determine if any threads of a process have been recently dispatched on the logical processor. This time to replace the cache, or the base heuristic time, may be used to derive a threshold.

If the logical processor on which the software thread had last been dispatched has not been undispatched since the last time the software thread was dispatched, it is very possible that some cache state is left for the software thread. In other words, if the logical processor remains dispatched to the same operating system, then it is likely that cache affinity will provide some performance benefit. In this case, affinity should be preserved.

If the target logical processor has been dispatched and undispatched a predetermined number of times since the software thread was undispatched, it is likely that the cache state for the thread is gone and affinity would not provide a performance benefit. In other words, the more times the logical processor is dispatched and undispatched, the more likely it is that the processor has been dispatched to another partition and its cache if filled with data that are not useful to the current software thread. That is, the software thread being dispatched is likely to experience a high number of cache misses.

If the target logical processor has been dispatched and undispatched since the software thread was undispatched and the number of non-affinity dispatches is non-zero, then cache state is likely lost for the thread. A non-affinity dispatch is a documented instance that the logical processor has been dispatched to a physical processor or core in a different cache domain or that the logical processor has been dispatched to a different logical partition.

In various embodiments, the algorithm for determining the value of affinity may include all or a subset of the above criteria. For example, the operating system may determine whether to use affinity as a criterion for dispatching a software thread to a logical processor based only on the amount of time that has elapsed since the last time the software thread was undispatched. In another embodiment, the operating system may use all of the above criteria or other criteria to determine whether the use cache affinity for dispatching the software thread.

If the operating system determines that affinity is not likely to provide a benefit, then selection of a logical processor on which to dispatch a software thread may be based on other criteria. These other criteria may include, for example, whether a logical processor is idle, whether a logical is idle but currently dispatched, best software priority fit, optimum usage of logical processors to improve overall system throughput, or any other standard operating system criteria.

Figure 6:
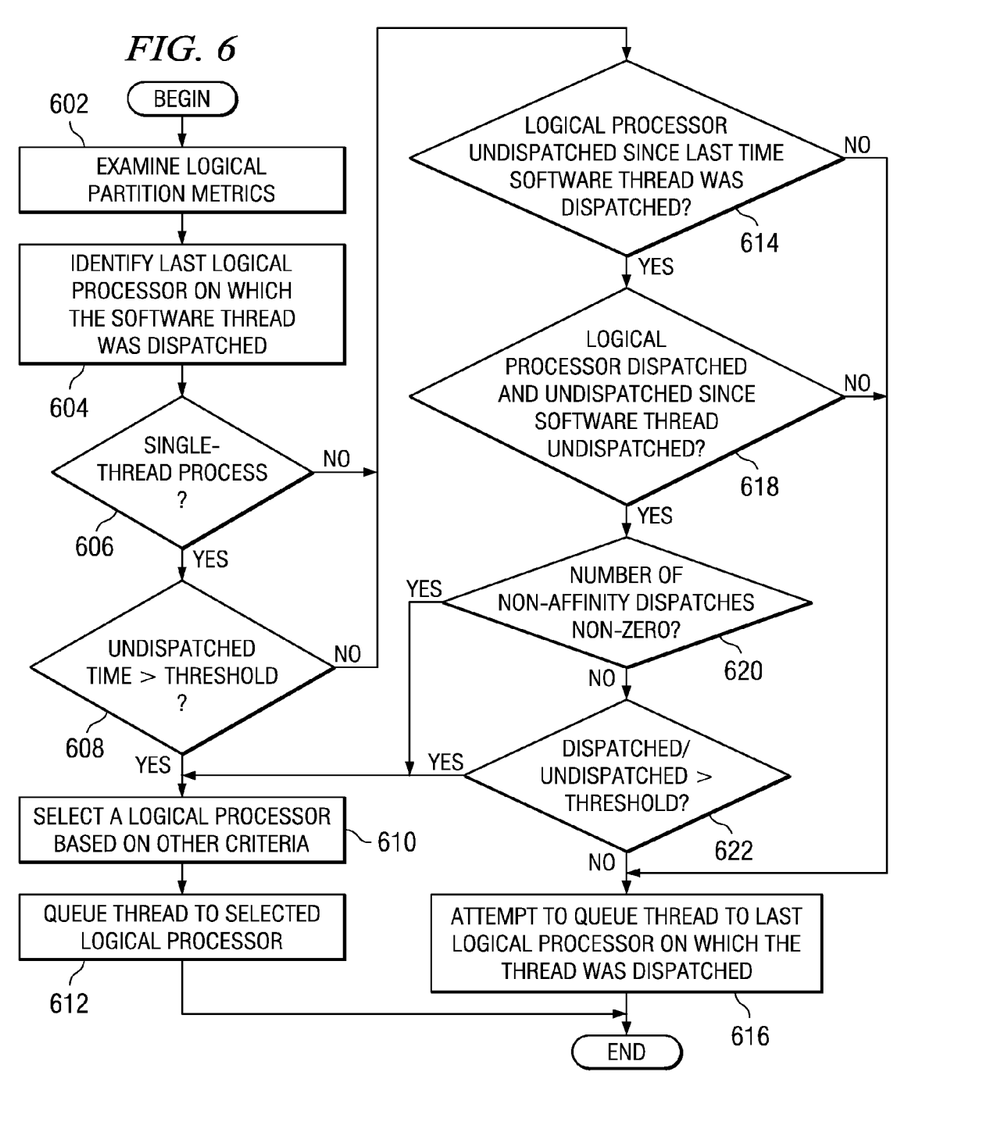
FIG. 6 is a flowchart illustrating operation of an operating system for dispatching a software thread in accordance with an exemplary embodiment.

FIG. 6 is a flowchart illustrating operation of an operating system for dispatching a software thread in accordance with an exemplary embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be embodied in a computer-readable memory, storage medium, or transmission medium that can direct a processor or other programmable data processing apparatus to function in a particular manner, such that the instructions stored in the computer-readable memory, storage medium, or transmission medium produce an article of manufacture including instruction means that implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

With particular reference to FIG. 6, operation begins when an operating system is ready to dispatch a software thread to a logical processor. The operating system examines collected logical partition metrics (block 602). The operating system identifies the last logical processor on which the software thread was dispatched (block 604).

The operating system determines whether the software thread is part of a single threaded process (block 606). If the software thread is part of a single threaded process, the operating system determines whether the amount of time the software thread was undispatched is greater than a threshold (block 608). The threshold may be based on the amount of time it would take to replace the cache, which may be related to the sizes of the processor caches and the miss rate. If the amount of time the software thread was undispatched is greater than the threshold, the operating system selects a logical processor based on other criteria (block 610) and attempts to queue the thread to the selected logical processor (block 612). Thereafter, operation ends.

If the software thread is not part of a single threaded process in block 606 or the amount of time the software thread was undispatched is not greater than the threshold in block 608, the operating system determines whether the logical processor has been undispatched since the last time the software thread was dispatched (block 614). If the logical processor has not been undispatched, then the operating system attempts to queue the thread to the last logical processor on which the thread was dispatched (block 616). Thereafter, operation ends.

If the logical processor has been undispatched since the last time the software thread was undispatched in block 614, then the operating system determines whether the logical processor has been dispatched and undispatched since the software thread last undispatched (block 618). If the logical processor has not been dispatched and undispatched, then the operating system attempts to queue the thread to the last logical processor on which the thread was dispatched (block 616). Thereafter, operation ends.

If the logical processor has been dispatched and undispatched since the last time the software thread was undispatched in block 618, the operating system determines whether the number of non-affinity dispatches is non-zero (block 620). If the number of non-affinity dispatches is non-zero, the operating system selects a logical processor based on other criteria (block 610) and attempts to queue the thread to the selected logical processor (block 612). Thereafter, operation ends.

If the number of non-affinity dispatches is zero in block 620, the operating system determines whether the number of times the logical processor has been dispatched and undispatched is greater than a predetermined threshold (block 622). This threshold may be set by an administrator or developer to ensure optimum performance. If the number of times the logical processor has been dispatched and undispatched is greater than the predetermined threshold, then the operating system selects a logical processor based on other criteria (block 610) and attempts to queue the thread to the selected logical processor (block 612). Thereafter, operation ends. However, if the number of times the logical processor has been dispatched and undispatched is not greater than the threshold, then the operating system attempts to queue the thread to the last logical processor on which the thread was dispatched (block 616). Thereafter, operation ends.

Thus, the exemplary embodiments solve the disadvantages of the prior art by providing a mechanism for determining whether to use cache affinity as a criterion for software thread dispatching in a shared processor logical partitioning data processing system. The server firmware may store data about when and/or how often logical processors are dispatched. Given these data, the operating system may collect metrics. Using the logical processor metrics, the operating system may determine whether cache affinity is likely to provide a significant performance benefit relative to the cost of dispatching a particular logical processor to the operating system.

It is important to note that the illustrative embodiments may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

As described previously, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for dispatching a software thread to a logical processor in a shared processor logical partition, the method comprising:
    responsive to a software thread being made ready to run, determining, by an operating system running in a shared processor logical partition in a logical partitioned data processing system, whether cache affinity is not likely to provide a performance benefit, wherein the operating system determines that cache affinity is not likely to provide a performance benefit responsive to determining that a logical processor on which the software thread was last dispatched has been dispatched and undispatched a predetermined number of times since the last time the software thread was undispatched;
    responsive to a determination that cache affinity is not likely to provide a performance benefit, selecting, by the operating system, a logical processor based on other criteria; and
    queuing, by the operating system, the software thread to run on the selected logical processor.

2. The method of claim 1, further comprising:
    responsive to a determination that cache affinity is likely to provide a performance benefit, identifying a logical processor on which the software thread was last dispatched; and
    queuing the software thread to run on the logical processor on which the software thread was last dispatched.

3. The method of claim 1, wherein the operating system determines that cache affinity is not likely to provide a performance benefit
    responsive to determining that the software thread has been undispatched for a predetermined period of time.

4. The method of claim 1, wherein the operating system determines that cache affinity is not likely to provide a performance benefit
    responsive to determining that a logical processor on which the software thread was last dispatched has not been undispatched since the last time the software thread was dispatched.

5. The method of claim 1, wherein the operating system determines that cache affinity is not likely to provide a performance benefit responsive to determining that a number of non-affinity dispatches of a logical processor on which the software thread was last dispatched is non-zero.

6. The method of claim 1, further comprising:
collecting, by the operating system, logical partition metrics for each logical processor by monitoring a virtual processor area provided for each virtual processor for communication with the operating system.

7. An apparatus for dispatching a software thread to a logical processor in a shared processor logical partition, the apparatus comprising:
a plurality of processors;
a server firmware that dispatches the one or more of the plurality of processors to one or more shared processor logical partitions; and
an operating system running in a shared processor logical partition within the one or more shared processor logical partitions,
wherein responsive to a software thread being made ready to run, the operating system determines whether cache affinity is not likely to provide a performance benefit, wherein the operating system determines that cache affinity is not likely to provide a performance benefit responsive to determining that a logical processor on which the software thread was last dispatched has been dispatched and undispatched predetermined number of times since the last time the software thread was undispatched;
wherein responsive to a determination that cache affinity is not likely to provide a performance benefit, the operating system selects a logical processor based on other criteria; and
wherein the operating system queues the software thread to run on the selected logical processor.

8. The apparatus of claim 7, wherein responsive to a determination that cache affinity is likely to provide a performance benefit, the operating system identifies a logical processor on which the software thread was last dispatched and queues the software thread to run on the logical processor on which the software thread was last dispatched.

9. The apparatus of claim 7, wherein the server firmware provides a virtual processor area for each virtual processor for communication with the operating system;
wherein the operating system collects logical partition metrics for each logical processor by monitoring the virtual processor area.

10. The apparatus of claim 7, wherein the operating system determines that cache affinity is not likely to provide a performance benefit responsive to determining that the software thread has been undispatched for a predetermined period of time.

11. The apparatus of claim 7, wherein the operating system determines that cache affinity is not likely to provide a performance benefit responsive to determining that a logical processor on which the software thread was last dispatched has not been undispatched since the last time the software thread was dispatched.

12. The apparatus of claim 7, wherein the operating system determines that cache affinity is not likely to provide a performance benefit responsive to determining that a number of non-affinity dispatches of a logical processor on which the software thread was last dispatched is non-zero.

13. A computer program product comprising a computer storage medium having a computer readable program stored thereon, wherein the computer readable program, when executed on a computing device, causes the computing device to:
responsive to a software thread being made ready to run, determine, by an operating system running in a shared processor logical partition in a logical partitioned data processing system, whether cache affinity is not likely to provide a performance benefit, wherein the operating system determines that cache affinity is not likely to provide a performance benefit responsive to determining that a logical processor on which the software thread was last dispatched has been dispatched and undispatched a predetermined number of times since the last time the software thread was undispatched;
select, by the operating system, a logical processor based on other criteria responsive to a determination that cache affinity is not likely to provide a performance benefit; and
queue, by the operating system, the software thread to run on the selected logical processor.

14. The computer program product of claim 13, wherein the computer readable program further causes the computing device to, responsive to a determination that cache affinity is likely to provide a performance benefit, identify a logical processor on which the software thread was last dispatched; and queue the software thread to run on the logical processor on which the software thread was last dispatched.

15. The computer program product of claim 13, wherein the operating system determines that cache affinity is not likely to provide a performance benefit responsive to determining that the software thread has been undispatched for a predetermined period of time.

16. The computer program product of claim 13, wherein the operating system determines that cache affinity is not likely to provide a performance benefit responsive to determining that a logical processor on which the software thread was last dispatched has not been undispatched since the last time the software thread was dispatched.

17. The computer program product of claim 13, wherein the operating system determines that cache affinity is not likely to provide a performance benefit responsive to determining that a number of non-affinity dispatches of a logical processor on which the software thread was last dispatched is non-zero.

18. The computer program product of claim 13, wherein the computer readable program, when executed on a computing device, causes the computing device to:
collect logical partition metrics for each logical processor by monitoring a virtual processor area provided for each virtual processor for communication with the operating system.

* * * * *